UNITED STATES PATENT OFFICE.

SYLVESTER ZUCKSCHWERDT, OF STASSFURT, GERMANY.

TREATMENT OF REFRACTORY BRICKS.

SPECIFICATION forming part of Letters Patent No. 707,670, dated August 26, 1902.

Application filed May 9, 1901. Serial No. 59,523. (No specimens.)

*To all whom it may concern:*

Be it known that I, SYLVESTER ZUCKSCHWERDT, a subject of the Emperor of Germany, and a resident of Stassfurt, Germany, have invented certain new and useful Improvements in the Treatment of Refractory Bricks, of which the following is a specification.

The object of this invention is to increase the refractory properties of baked bricks and the like of magnesia and clay, which is effected by filling the pores and crevices of the said bricks or the like with magnesia or alumina or a mixture thereof. The said bricks or the like are saturated with a solution of magnesium chlorid or aluminium chlorid or with a mixture thereof. When the said bricks or the like so saturated are subjected to the heat which they are intended to withstand, decomposition of the salt or salts takes place and hydrochloric acid is given off, the magnesia or alumina remaining and filling the pores and crevices, thereby increasing not only the refractory character of the bricks or the like, but also their imperviousness to gases and their power to resist the action of melting alkalies.

I claim—

The process herein described of increasing the refractory properties of baked bricks and the like, which consists in saturating them with a solution of a magnesium chlorid, then subjecting them to the action of heat to dissolve the salts and evolve the hydrochloric acid, substantially as set forth.

In testimony whereof I have signed my name to this specification in the presence of two subscribing witnesses.

SYLVESTER ZUCKSCHWERDT.

Witnesses:
HEINRICH ZÖRIG,
HEINRICH HARLAND.